(12) United States Patent
Bell

(10) Patent No.: US 6,449,108 B1
(45) Date of Patent: Sep. 10, 2002

(54) SYNTHETIC ERECTOR LENS MOUNT

(75) Inventor: Dennis L. Bell, Greeley, CO (US)

(73) Assignee: Burris Company, Inc., Greeley, CO (US)

( * ) Notice: Subject to any disclaimer, the term of this patent is extended or adjusted under 35 U.S.C. 154(b) by 0 days.

(21) Appl. No.: 09/755,453

(22) Filed: Jan. 5, 2001

(51) Int. Cl.$^7$ .............................. G02B 7/02; G02B 23/00
(52) U.S. Cl. ........................................ 359/823; 359/425
(58) Field of Search ................................ 359/819, 820, 359/823, 894, 600, 418, 419, 420, 421, 422, 425, 426, 427, 429, 430, 431, 432; 356/251, 252; 250/330

(56) References Cited

U.S. PATENT DOCUMENTS

| | | | | |
|---|---|---|---|---|
| 4,982,502 A | * | 1/1991 | Weyrauch | 42/122 |
| 4,986,645 A | * | 1/1991 | Ekstrand | 359/422 |
| 4,998,811 A | * | 3/1991 | Basta | 359/422 |
| 5,020,892 A | * | 6/1991 | Glover et al. | 359/399 |
| 5,122,909 A | * | 6/1992 | Butler | 359/809 |
| 5,671,088 A | * | 9/1997 | Mai et al. | 359/424 |
| 5,764,410 A | * | 6/1998 | Jibiki | 576/410 |
| 5,771,595 A | * | 6/1998 | Bell | 42/122 |
| 6,005,711 A | * | 12/1999 | Mai et al. | 359/424 |
| 6,292,311 B1 | * | 9/2001 | Bohn et al. | 359/819 |

* cited by examiner

Primary Examiner—Loha Ben
Assistant Examiner—Saeed H Seyrafi
(74) Attorney, Agent, or Firm—Thomas W. Hanson

(57) ABSTRACT

A synthetic erector lens mount for use in a rifle scope or similar optical instrument incorporating glides, or rails, which ride on the inner surface of the guide tube. Biasing fingers, or tabs, incorporate raised bulges, or angle radially outward from the body of the mount, or both, so that they push outward on the walls of the guide tube, pushing the mount against the glides. Preferably the mount incorporates a recess on the inner wall of the mount for capturing a nut or other fastener, a hole through the wall of the mount, and a flattened area of the outer surface of the mount, parallel to the recess and aligned with the hole, for removably attaching a guide sleeve which engages the slots in the guide tube and cam tube for adjustment of the erector lens.

19 Claims, 6 Drawing Sheets

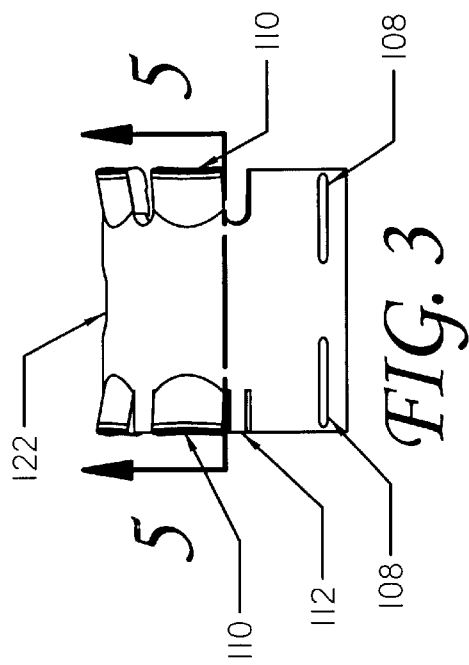
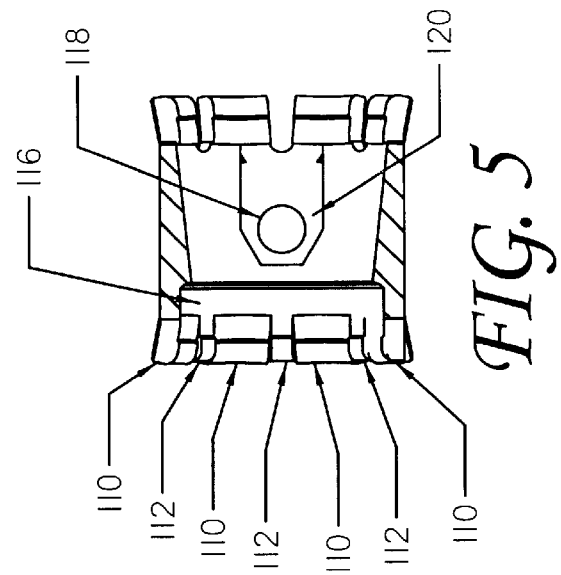
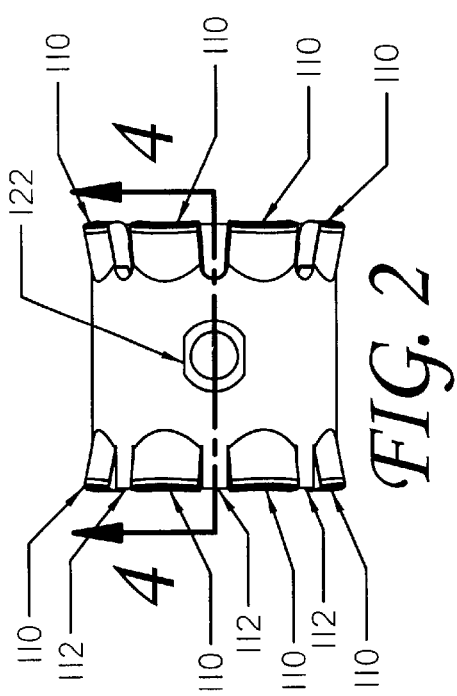
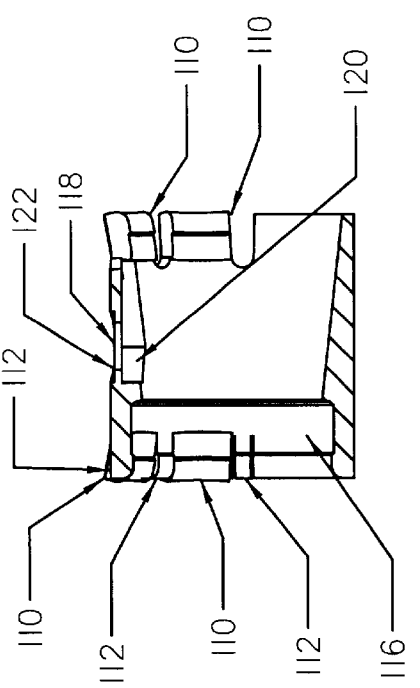

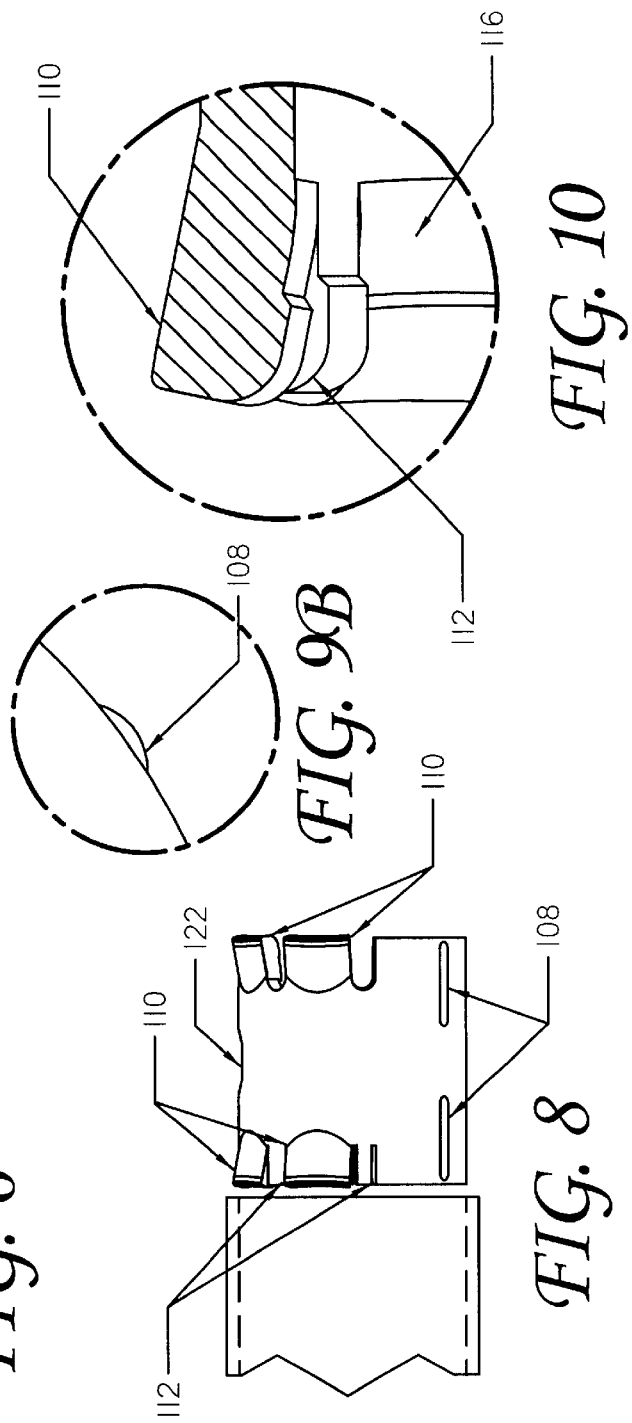

SYNTHETIC ERECTOR LENS MOUNT

FIELD OF THE INVENTION

This invention relates to lens mounts and specifically to a mount for an erector lens within a scope.

BACKGROUND OF THE INVENTION

A rifle scope (or other gun scope) serves to magnify the target and overlay a visual aiming point, the reticle, on the target. It does this through the use of a series of lenses mounted within a generally tubular body and a combination of mechanisms to adjust the lenses.

The lenses in a scope can be broadly grouped into three categories: the objective lenses; erector lenses, and ocular (or eyepiece) lenses. Depending on the particular design there may be one or more individual lenses in each group within a scope. The objective lens gathers in the light from the target and prepares the image for the subsequent lenses, such as by magnifying the image, producing an inverted image of the target. The erector lenses further magnify or reduce the image and correct it to right side up. The ocular lenses coordinate the image and present it to the eye for viewing.

In a typical scope, the erector lenses are carried by a guide tube positioned within the scope body and mounted so that it pivots at one end. The opposite end of the guide tube can be adjusted horizontally and vertically to provide windage and elevation correction.

Variable magnification can be achieved by providing a means of adjusting the position of the erector lenses in relationship to each other within the guide tube. This is typically done through the use of a cam tube which fits closely around the guide tube. Each erector lens (or lens group) is mounted in an erector lens mount which slides within the guide tube. A guide sleeve attached to the erector lens mount slides in a straight slot in the body of the guide tube to maintain the orientation of the erector lens. This same guide sleeve also engages an angled, or curving, slot in the cam tube. Turning the cam tube causes the erector lens mount to move lengthwise within the guide tube, varying the magnification. Each erector lens will have its own slot in the cam tube and the configuration of these slots determines the amount and rate of magnification change as the cam. tube is turned.

In order for the scope to remain accurately sighted as the magnification is adjusted, it is critical that the alignment between the erector lenses and the guide tube remain constant throughout the movement. To achieve this, the tolerance between the outside diameter of the erector lens mount and the inside diameter of the must be very tight, typically on the order of 0.0004 in.

Unfortunately, the tubing from which the guide tube is manufacture is typically extruded and its inside diameter may vary by amounts in the range of 0.00025 in. This requires that conventional metal erector lens mounts must be made in several outside diameters. The guide tubes are then individually gauged and sorted into groups for use with the available erector lens mounts. This minimizes the fit problems but there are still inherent variations. In addition, the inside diameter of a guide tube may vary throughout the length of the tube within which the erector mount travels.

A loose fit between the erector lens mount and the guide tube may cause the mount to cock in the tube. This can change the aim point of the scope and can cause the mount (and thus the image) to jump when the mount catches and then frees up. Finer gradations in available erector lens mount diameters can improve the tolerances but at the cost of an increased number of parts in inventory and increased expense.

The manufacturing process for a conventional metal erector lens mount is a complex multi-step process. A typical process includes at least the steps of: lathe turning; drill and tap for the guide sleeve; grind to finish size; black oxide coat to reduce reflections; fit and secure the lenses; and clean to remove excess glue and contaminants. Some of these steps require the use of hazardous materials and/or may generate hazardous wastes. As a result, the erector lenses and mounts contribute significantly to the overall cost of a scope.

The same basic scope may be manufactured in several variations, or families, differing in features such as eye relief or field of view. These feature may require different erector lenses. Typically this means that different erector lens mounts and guide tubes will be used to accommodate the lenses. This further increases the number of parts which must be maintained in inventory and thus increases costs.

An effect known as coining also impacts the fit between the erector lens mount and the guide tube. When the slot for the guide sleeve is machined in the guide tube, it may release stresses within the tube and allow the tube to expand slightly. This alters the inside diameter of the tube and the size of the slot itself. This adversely effects the fit between the erector lens mount and the guide tube as well as the fit between the guide sleeve and the slot. Compressing the tube after machining can correct for these problems, but this is a relatively low precision operation and can introduce further problems. As such, it is typically not performed where conventional erector lens mounts are used.

Because both the erector lens mounts and the guide tube are typically metal, lubrication is required on the mating surfaces to provide a smooth sliding action. With time, this lubricant can migrate to the surface of the lenses degrading image quality. The lubricant may also increase the reflectance of the mating surfaces.

There is a need for an improved erector lens mount which is capable of maintaining tight tolerances when fitted to guide tubes having slight variations in inside diameter without requiring multiple erector lens mount sizes and without requiring gauging of the tubes to match the mounts. This will decrease the inventory parts count and associated cost. There is a need for an erector lens mount which will adapt to variations in inside diameter of the guide tube throughout its range of travel without adversely impacting image quality. There is a need for an erector lens mount which can accommodate sufficient variations to allow for the correction of coining in the guide tube. There is a need for an erector lens mount which is readily adaptable to different erector lenses for use with different families of scopes, thereby further decreasing parts inventory and cost. There is a need for such an erector lens mount which can be manufactured with a reduced number of steps and steps which reduce the use and production of hazardous materials or effluents from processing. There is a need for such an erector lens mount which operates without additional lubricant.

SUMMARY OF THE INVENTION

The present invention is directed to a synthetic erector lens mount for a rifle scope or similar. The mount is generally a tube with the lens mounted within the central passage and includes spring biasing fingers which push outward against the walls of the guide tube. Preferably the mount is injection molded from low reflectance, low friction, or self lubricating, plastic.

According to the invention there are provided glides, or rails, which ride on the inner surface of the guide tube and are arranged generally opposite the fingers so that the fingers urge the glides into contact with the guide tube.

According to an aspect of the invention the fingers may include a raised portion intended to contact the guide tube, may be angled outward toward the tube, or both.

According to another aspect of the invention the glides have a gap spanning the midpoint of the mount so that an imperfection in the wall of the guide tube will not cause the mount to rock at the midpoint.

Further in accordance with the invention the glides have an outermost point with a radial distance from the centerline of the mount which is substantially equal to the nominal radius of the guide tube.

Still further in accordance with the invention, the mount has a flat recess in its inner wall for seating a nut and an aligned and parallel flat area in the outer wall so that a guide sleeve can be seated on the outer flat area and a screw passed through the sleeve and wall of the mount and threaded into the nut so that the nut and sleeve sandwich the wall of the mount between them, providing a stable mount for the sleeve.

The advantages of such an apparatus are a lens mount which is easily manufactured and adapts to slight irregularities in the inner wall of a guide tube and to variations in the inner diameter from one tube to another. This allows the mount to maintain tight fit tolerances without requiring multiple sizes of mounts to be matched with tubes having inner diameters varying from nominal. This adaptation will also accommodate variations due to either coining or the correction of coining. By interchanging the inner core of the injection mold, the mount can be adapted to multiple lenses while maintaining the same outside profile, allowing the use of a single size of guide tube for the multiple lenses. The manufacture of the mount eliminates many of the conventional manufacturing steps because required features can be molded into the mount. Proper selection of the plastic can provide a low glare, low friction material eliminating the need to plate and lubricate the mount.

The above and other features and advantages of the present invention will become more clear from the detailed description of a specific illustrative embodiment thereof, presented below in conjunction with the accompanying drawings.

BRIEF DESCRIPTION OF THE DRAWINGS

FIG. 2 is a top view of the lens mount.

FIG. 3 is a side view of the lens mount.

FIG. 4 is a vertical cross section through the lens mount.

FIG. 5 is a horizontal cross section through the lens mount looking upward.

FIG. 6 is an end view of the lens mount.

FIG. 7 is a cross section through the lens mount at an angle to pass through the middle of one of the fingers.

FIG. 8 illustrates the relationship of the lens mount and the fingers to the guide tube.

FIG. 9A is a detailed view of the end of one of the fingers.

FIG. 9B is a detailed view of the end of one of the glides.

FIG. 10 is a detailed view of a section through one of the fingers illustrating the angle of the fingers.

DETAILED DESCRIPTION OF THE INVENTION

The following discussion focuses on the preferred embodiment of the invention, as an erector lens mount for a rifle scope. However, as will be recognized by those skilled in the art, the disclosed apparatus is applicable to a wide variety of situations in which a sliding mount is desired for an intermediate lens within an optical instrument including but not limited to spotting scopes, telescopes, etc.

Glossary

The following is a brief glossary of terms used herein. The supplied definitions are applicable throughout this specification and the claims unless the term is clearly used in another manner.

Erector Lens—generally the intermediate lens in a scope which re-inverts the image from the objective lens to the upright position. However, this term should be understood to mean any similarly adjustable intermediate lens in an optical instrument.

Guide sleeve—protrusion from the erector lens mount which engages a slot in the guide tube and/or cam tube or which serves an analogous purpose. This could be integral to the mount or detachable as in the preferred embodiment.

Guide Tube—any structure or device having an opening to receive an erector lens mount.

Scope—generally a rifle scope as discussed relative to the preferred embodiment. However, this term should be understood to mean any similar optical instrument, such as a telescope, pistol scope, or spotting scope, which uses a sliding intermediate lens.

Preferred Embodiment

The disclosed invention is:described below with reference to the accompanying FIGS. in which like reference numbers designate like parts. Generally, numbers in the 200's refer to prior art elements or elements in the surrounding environment while numbers in the 100's refer to elements of the invention.

Overview

Figure 1:
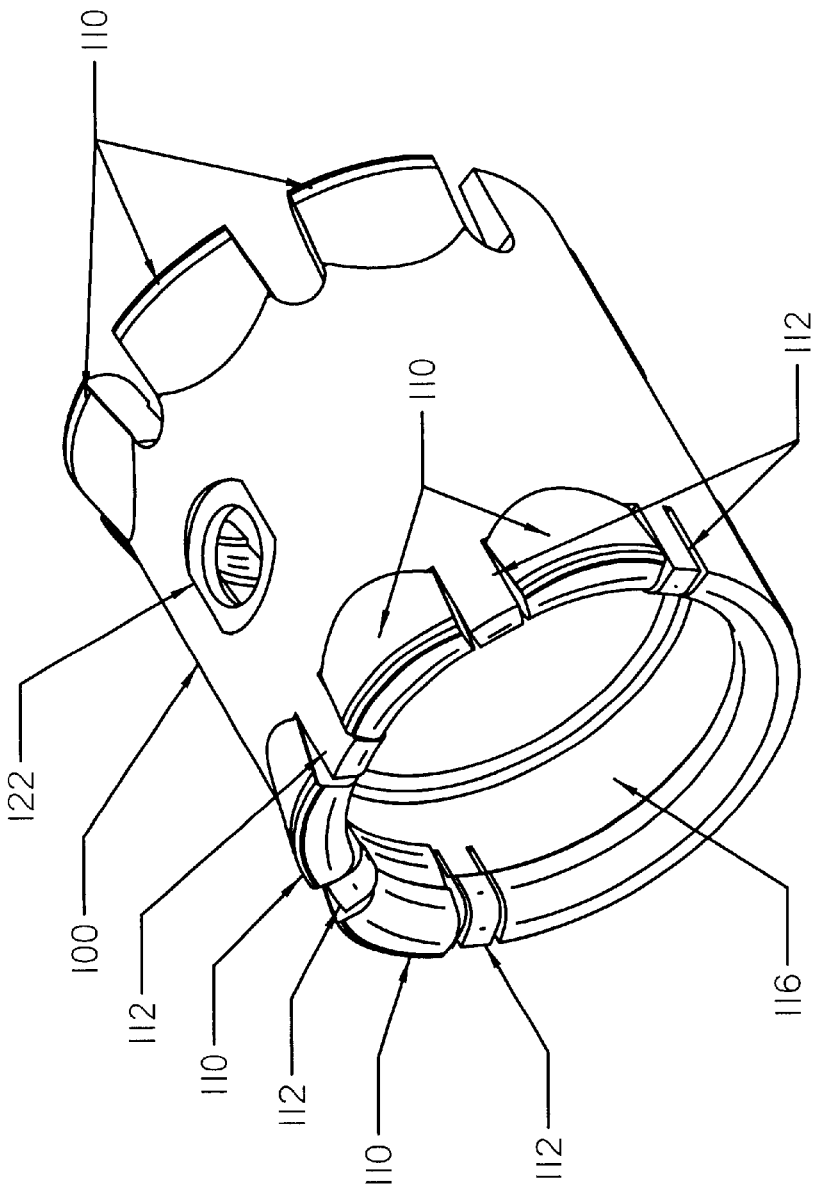
FIG. 1 provides an isometric view of the inventive erector lens mount.
Figure 11:
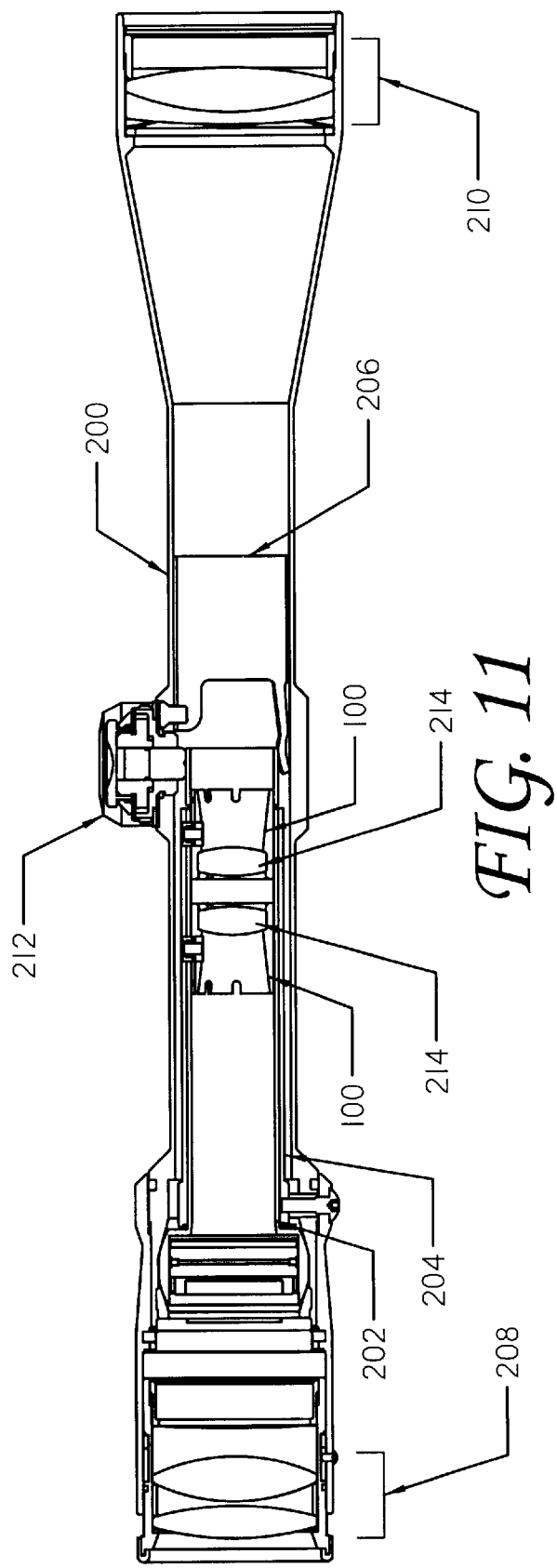
FIG. 11 is a cutaway view: of a typical rifle scope showing the major components.
Figure 12:
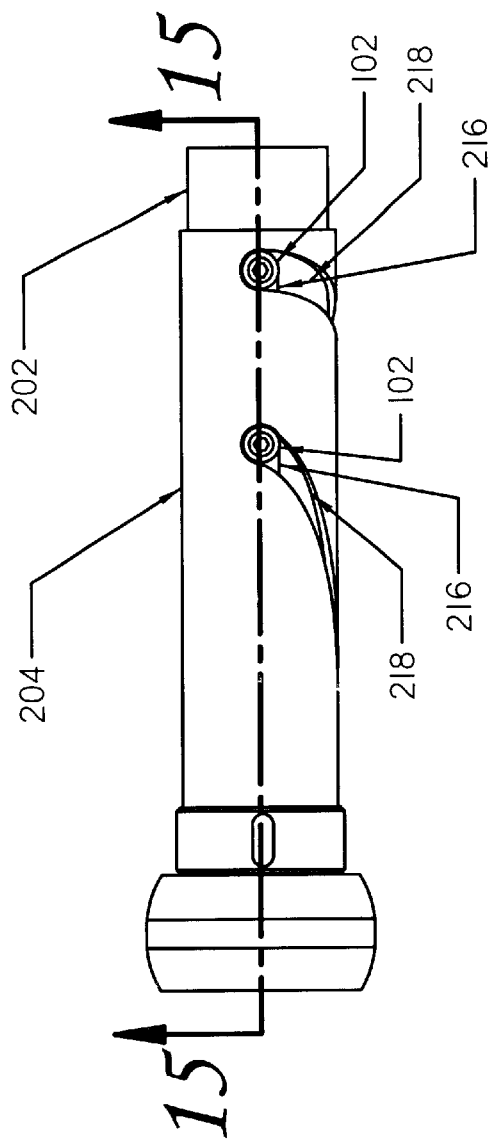
FIG. 12 is a top view of a guide tube and cam tube.
Figure 13:
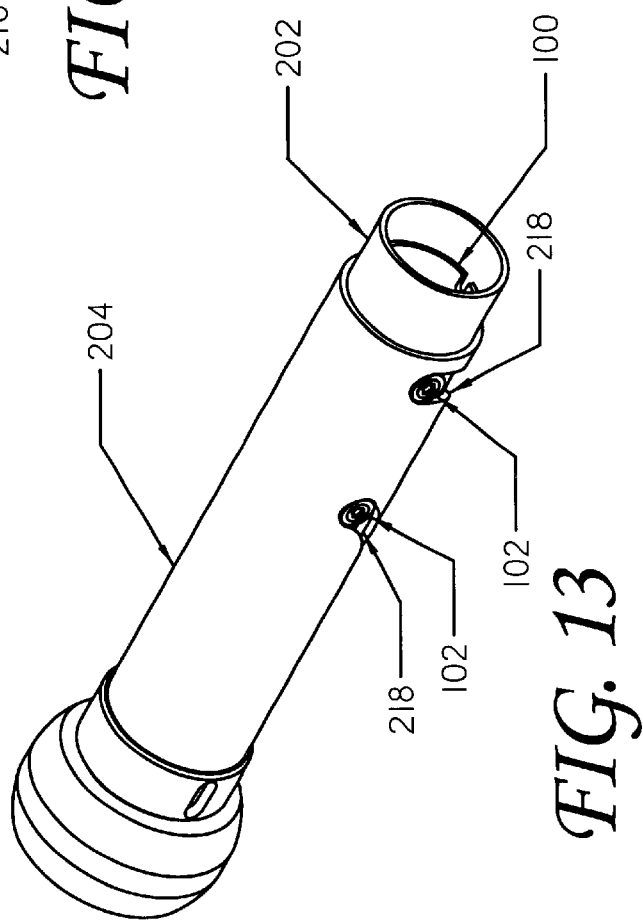
FIG. 13 provides an isometric view of a guide tube and cam tube.

FIG. 11 is a cross section through a typical rifle scope, 200, fitted with erector lens mounts, 100, according to the present invention. The erector lens mounts are carried within the guide tube, 202, and are adjusted by cam tube, 204, which fits closely around the guide tube. Elevation adjustment, 212, adjusts the vertical position of the end of the guide tube against novel sleeve spring, 206. A similar mechanism provides windage adjustment by adjusting the horizontal position of the end of the guide tube. The objective lens group, 210, gathers the light from the target, magnifies it and directs it to the erector lenses, 214, carried by the erector lens mounts. The light is then transmitted to the ocular lens group, 208, for presentation to the user's eye.

FIGS. 12–15 provide a more detailed view of the inventive erector lens mounts, 100, and their relationship to the guide tube, 202, and cam tube, 204. The erector lens mounts fit closely within the guide tube and are free to slide along the inside of the tube. The guide sleeves, 102, pass through linear slot, 216 in the guide tube and engage curved slots, 218, in the cam tube. In this manner, turning the cam tube causes the erector lens mounts to move along the guide tube.

Structure

The inventive erector lens: mount, 100, is illustrated in detail in FIGS. 1–10. The main body of the mount is cylindrical and has an outside diameter somewhat smaller than the inside diameter of the guide tube with which it is designed to mate. Generally this difference is on the order of 0.008 in. but is not critical to the invention as the main body does not contact the guide tube.

The erector lens mount rides on glides, 108, which are positioned on the lower half of the mount and are preferably distributed symmetrically about the vertical axis. In the preferred embodiment, the glides are not continuous from end to end but are separated into segments proximate the ends of the mount. In the preferred embodiment the glides extend approximately 0.0070 in beyond the outer surface of the main body, but the exact dimension is not critical. Of more importance is that the radial distance from the center of the mount to the outermost surface of the glides, where they contact the guide tube, is substantially matched to the nominal radius of the inner surface of the guide tube.

The use of the glides, 108, improves the tolerances which can be achieved by the erector lens mount. Where a cylindrical erector lens mount passes over an imperfection in the wall of the guide tube, the mount will be deflected by the full amount of the imperfection. When the imperfection is positioned at the middle of the mount, the mount may pivot on the imperfection. With discrete glide segments positioned proximate the ends of the mount, the mount will never be deflected by the full amount of the imperfection, as this would occur when the imperfection is at the middle of the mount, where there are no glides. Similarly, the pivoting motion encountered by a conventional mount can not occur.

The positioning of the glides also minimizes the effects of either coining or the compression of the tube to correct for coining. The position of the glides, 108, is substantially opposite the slot, 216, where most of the effects will occur. This positioning of the glides also results in both the force of gravity and that of the fingers, 110, acting in the same direction, urging the glides into contact with the wall of the guide tube.

The upper half of the erector lens mount comprises a plurality of fingers, 110, which bear against the inner surface of the guide tube. The primary purpose is to apply a biasing force to the mount. When unrestrained, each finger angles outward slightly, away from the centerline of the mount, see detailed view FIG. 10. The exact angle is not critical and can be varied to adjust the biasing force and adapt to various mount and tube dimensions. Further, when viewed from the end, FIG. 6 and detailed view 9A, each finger has a slight bulge or raised portion, 114, which raises its outer surface slightly above the surface of the main body in a manner similar to that of the glides. Preferably this. bulge has a curved profile and extends radially outward relative to the longitudinal center of the main body. The combination of the angle and the bulge preferably causes the outermost surface of the fingers to extend approximately 0.0060 in. to 0.0100 in. beyond the nominal radius of the inside surface of the guide tube. This results in the fingers being flexed inward when the mount is installed in the guide tube, resulting in a biasing force on the mount in the direction of the glides. This keeps the glides firmly seated against the guide tube.

The design of the fingers,110, is such that they offer the same performance advantages as the glides relative to compensating for imperfections since they provide discrete contact regions proximate to the ends of the erector lens mount. In addition, the fingers are free to flex slightly inward and outward to accommodate irregularities in the guide tube surface whether encountered by the fingers themselves or by the glides, 108. Where it is the fingers alone which encounter the irregularity, the fingers will absorb the variation and the body of the mount will not be deflected at all. The range of motion available in the fingers is also sufficient to accommodate tube to tube variations in inside diameter which occur during manufacture. This means that a single size of erector lens mount can be used for all guide tubes of a specified size, rather than the plurality of sizes, and the associated gauging step, required when using a conventional metal mount.

Preferably, on the end of the erector lens mount nearest the lens seat, 116, a set of intermediate tabs, 112, are not angled outward like the fingers and remain substantially aligned with the main body. This improves retention and alignment of the lens within the lens seat.

The lens seat, 116, is generally a groove around the inner surface of the erector lens mount orthogonal to the longitudinal axis of the mount. The profile of the groove is substantially the same as the profile of the edge of the erector lens, or lens group, to be supported by the mount. Where the lens is molded in, the groove will be identical to the lens profile. The innermost edge of the seat also forms a fixed diaphragm whose diameter is determined during manufacturing. The erector lens mount is preferably injection molded using separate outer and inner core components of the mold. Interchanging the inner core allows the mount to be readily adapted to a different erector lens and/or to change the diameter of the diaphragm opening. Since this can be done without altering the dimensions of the outside of the mount, a variety of lenses can be used with a common guide tube. This greatly simplifies production and decreases the number of parts which must be maintained in inventory. Where the inventive erector lens mount is used across all scope families supplied by a manufacturer, hundreds of distinct parts may be eliminated.

Where a conventional erector lens mount uses a guide sleeve which is attached to the mount by a screw using a threaded hole in the body of the mount (which must be machined), the inventive erector lens mount uses a separate nut. This nut is inserted into hole, 118, and is retained by seat, 120, both of which are molded into the mount. These features are most clearly seen in FIGS. 4 & 5. The seat is formed in a partial hex shaped profile to receive and capture a hex shaped nut, 106 FIG. 14. Once the nut is inserted, the molded seat will keep the nut from turning, simplifying installation of the sleeve, 102. Planar surface, 122, in the outer surface of the mount provide a flat area against which the base of the sleeve bears.

Figure 14:
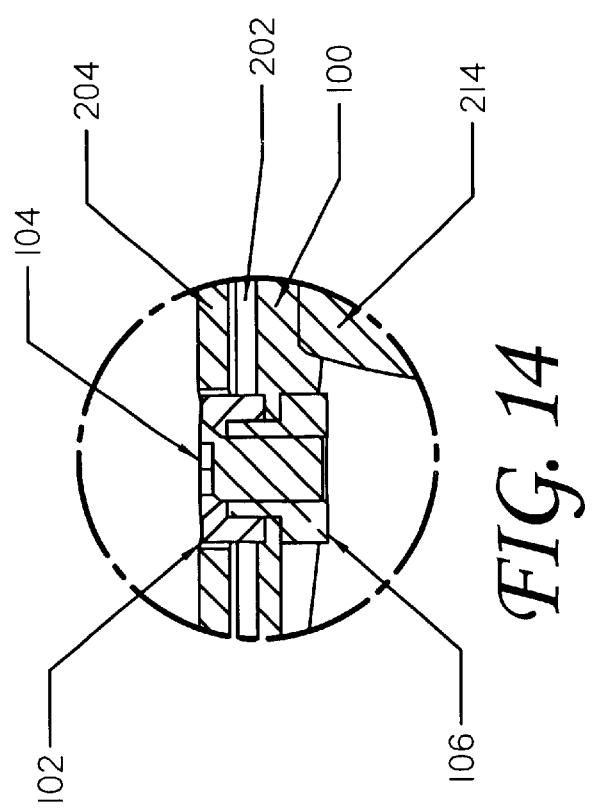
FIG. 14 is a detailed view of the guide sleeve.
Figure 15:
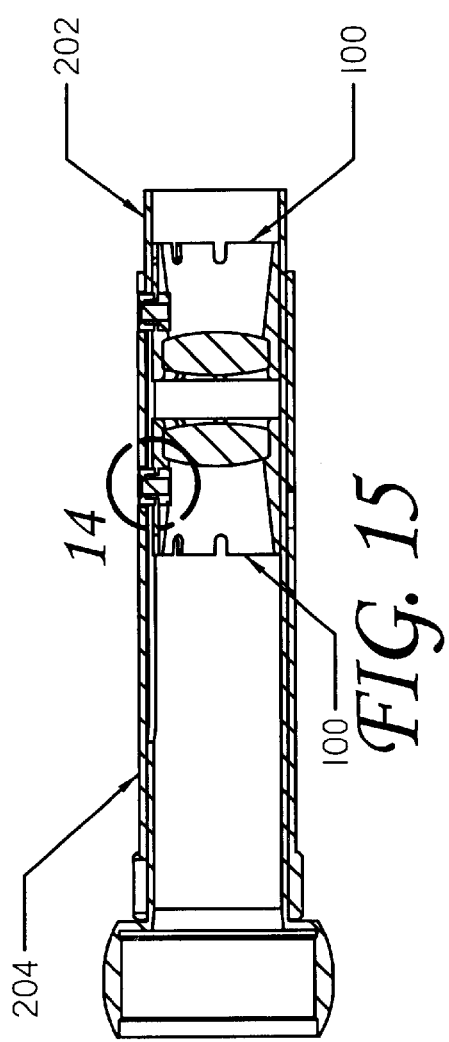
FIG. 15 is a vertical cross section through the cam tube and guide tube showing the relative placement of the erector lens mounts.

FIG. 14 provides a detailed view of the structure of the guide sleeve subassembly. The body of the nut, 106, passes through the body of the erector lens mount with the shoulders of the nut mating with the seat, described above. Sleeve, 102, fits over the body of the nut and bears against the flat area on the outside of the mount body. Screw, 104 is inserted through the sleeve and threads into the nut. When the screw is tightened, the sleeve and nut are drawn together, sandwiching the body of the mount between them. This provides a very strong, stable attachment of the sleeve to the mount body.

Manufacturing and Assembly

The erector lens mount is preferably injection molded of a suitable plastic using an interchangeable core mold to allow for easy adaptation to different lenses. The lens may be glued in after molding or may be insert molded. Insert molding offers the advantages of minimizing handling of the lens, reducing risk of damage and reducing cleaning of the lens. The plastic may be any of the many commercially available materials which meet the desired performance characteristics. Because of the functioning of the mount, the plastic should have good shape memory and minimal cold flow. Plastics from the Polyetheretherketone (PEEK) and polyetherketone (PEK) families have been found to be good candidates. Ideally the material should allow for the incorporation of coloring (typically black) prior to molding and should be low friction or self-lubricating to eliminate the need for an external lubricant.

This manufacturing process eliminates several steps as compared to a conventional erector lens mount and eliminates or reduces the use and production of hazardous wastes. As a minimum, turning, centerless grinding, drilling and tapping, and black oxide coating step can be eliminated along with the related lubricants, coolants, and solvents.

Assembly of the erector lens mounts into the guide tube is relatively simple. As manufactured, the fingers of the mount will protrude slightly beyond the inside diameter of the guide tube, see FIG. 8. These fingers will be compressed slightly, allowing the mount to be inserted into the guide tube. If desired, a tapered fixture can be used to assist in this step. With the mount inserted, the nut, 106 is seated (using an assembly tool if desired); the hole, 118, lined up with the slots in the guide tube and cam tube; the sleeve, 102, placed over the nut, through the slots; the screw, 104, inserted through sleeve into the nut; and tightened to the desired torque.

Alternative Embodiments

While the preferred embodiment uses glides distributed on the lower half of the erector lens mount and fingers on the upper half, an alternative embodiment could eliminate the glides and use fingers around the entire circumference of the erector lens mount.

Clearly other numbers and orientations of the fingers than that of the preferred embodiment could also be used. One such alternative is to use a single finger on top of each end, providing a three point contact for the erector lens mount when combined with the glides. Or two closely spaced fingers on each end would provide similar results while spanning the slot in the guide tube.

A further alternative embodiment of the fingers would be to provide one or more biasing fingers at approximately the midpoint of the erector lens mount body rather than in separate sets at either end. While less optimal than the preferred embodiment, this arrangement could provide adequate performance for some situations, especially where they are positioned intermediate to the glides.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. In a scope having a guide tube for an intermediate lens, the guide tube having an inner surface with an inside radius, an improved mount for the intermediate lens comprising:

(a) a tubular main body having an inner and an outer surface;

(b) a lens seat adapted to mount the intermediate lens at least partially within said main body;

(c) at least one biasing finger connected to said main body and adapted to bear against the inner surface of the guide tube; and (d) plural glides extending at least slightly beyond said main body and adapted to bear against the inner surface of the guide tube.

2. The lens mount of claim 1 comprising plural of said biasing fingers, at least one positioned proximate to each end of said main body.

3. The lens mount of claim 2 wherein each of said biasing fingers comprises a raised portion extending radially outward.

4. The lens mount of claim 2 wherein each of said biasing fingers angles outwardly in a radial plane.

5. The lens mount of claim 4 wherein each of said biasing fingers further comprises an outwardly extending raised portion.

6. The lens mount of claim 5 wherein each of said fingers has an outermost surface extending beyond the nominal inside radius of the guide tube.

7. The lens mount of claim 6 wherein said outermost surface extends beyond the nominal inside radius by a distance in the range of 0.0060 in. to 0.0100 in.

8. The lens mount of claim 1 wherein said glides do not overlap the midpoint of said main body.

9. The lens mount of claim 8 wherein said glides are configured in at least two pairs, the glides of each of said pair longitudinally aligned and positioned proximate opposite ends of said main body.

10. The lens mount of claim 9 wherein each of said glides has a maximum radial distance from the centerline of said main body and said maximum radial distance is substantially equal to said guide tube inside radius.

11. The lens mount of claim 1 comprising at least two of said biasing fingers adjacent to and extending through said lens seat and further comprising at least one tab connected to said main body between said fingers, said tab adapted to retain the lens.

12. The lens mount of claim 1 wherein said main body defines a mounting hole passing radially outward through said body and a planar surface recessed into said outer surface, orthogonal to and coaxial with said mounting hole, for mounting a guide sleeve.

13. The lens mount of claim 12 wherein said body further defines a recess in said inner surface, coaxial with said mounting hole and parallel to said planar surface.

14. The lens mount of claim 13 further comprising a cylindrical guide sleeve having a first end abutting said planar surface, a nut abutting said recess, and a screw passing through said sleeve, through said mounting hole, and engaging said nut.

15. In a scope having a guide tube for an intermediate lens, the guide tube having an inner surface with an inside radius and a guide slot, an improved mount for the intermediate lens comprising:

(a) a cylindrical main body defining a passage for the transmission of light;

(b) a means for mounting the lens within said passage;

(c) biasing means for applying an outward force against the guide tube, and (d) plural glides extending at least slightly beyond said main body and adapted to bear against the inner surface of the guide tube; and wherein said biasing means urges said glides into contact with the guide tube.

16. The lens mount of claim 15 wherein said glides are arranged symmetrically about a vertical plane aligned with the longitudinal axis of said main body.

17. The lens mount of claim 16 wherein said biasing means comprises plural outwardly extending fingers proximate both ends of said main body and distributed across the upper half of said main body.

18. The lens mount of claim 17 further comprising a guide sleeve removably attached to said main body and adapted to engage the guide slot in the guide tube.

19. The lens mount of claim 18 further comprising a first threaded fastener captured within said passage and a second threaded fastener passing through said guide sleeve, through said main body and engaging said first fastener whereby said sleeve is removably attached.

* * * * *